(12) United States Patent
McAuliffe et al.

(10) Patent No.: US 9,919,411 B2
(45) Date of Patent: Mar. 20, 2018

(54) ACTIVE COOLING FOR POWER TOOL GRIPPING SURFACES

(71) Applicant: Nanjing Chervon Industry Co., Ltd., Nanjing (CN)

(72) Inventors: Patrick M. McAuliffe, Chicago, IL (US); Roger N. Amrol, Jr., Glenview, IL (US)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 127 days.

(21) Appl. No.: 14/962,452

(22) Filed: Dec. 8, 2015

(65) Prior Publication Data

US 2017/0157760 A1    Jun. 8, 2017

(51) Int. Cl.
*B25F 5/00* (2006.01)
*B23D 49/16* (2006.01)
*B25F 5/02* (2006.01)

(52) U.S. Cl.
CPC .............. *B25F 5/008* (2013.01); *B23D 49/16* (2013.01); *B25F 5/02* (2013.01)

(58) Field of Classification Search
CPC ............. B25F 5/008; B25F 5/02; B23D 49/16
See application file for complete search history.

(56) References Cited

U.S. PATENT DOCUMENTS

| | | | |
|---|---|---|---|
| 5,006,740 A | 4/1991 | Palm | |
| 5,347,684 A | 9/1994 | Jackson | |
| 6,155,354 A | 12/2000 | Pusateri et al. | |
| 6,523,267 B1 | 2/2003 | Osada et al. | |
| 7,424,779 B2* | 9/2008 | Tozawa | B23D 51/00 30/392 |
| 9,630,287 B2* | 4/2017 | Schuele | B23Q 11/127 |
| 2005/0202310 A1 | 9/2005 | Yahnker et al. | |
| 2009/0000128 A1* | 1/2009 | Kaiser | B25F 5/008 30/166.3 |

(Continued)

FOREIGN PATENT DOCUMENTS

| | | |
|---|---|---|
| DE | 102011078374 A1 | 1/2013 |
| DE | 102012223902 A1 | 6/2014 |

(Continued)

OTHER PUBLICATIONS

International Search Report corresponding to PCT Application No. PCT/EP2016/076883 (5 pages), dated Mar. 6, 2017.

*Primary Examiner* — Hwei C Payer
(74) *Attorney, Agent, or Firm* — Greenberg Traurig, LLP

(57) ABSTRACT

A power tool includes a housing having a front portion and a handle portion. The front portion defines a cavity that encloses a motor and includes a gripping portion surrounding the cavity. An insulating cover is provided on the gripping portion of the housing and includes a gripping surface. A thermoelectric cooling unit is located between the gripping portion of the housing and the insulating cover. The thermoelectric cooling unit has a cold side positioned in thermal contact with an inner surface of the insulating cover and a hot side positioned in contact with an outer surface of the gripping portion of the housing. The thermoelectric cooling unit is configured to absorb thermal energy from the insulating cover via the cold side of the thermoelectric cooling unit and to release the absorbed heat via the hot side of the thermoelectric cooling unit.

17 Claims, 4 Drawing Sheets

(56) References Cited

U.S. PATENT DOCUMENTS

| | | |
|---|---|---|
| 2009/0049694 A1 | 2/2009 | Morris |
| 2014/0262402 A1 | 9/2014 | Haman et al. |
| 2014/0285971 A1 | 9/2014 | Schuele et al. |
| 2014/0338948 A1* | 11/2014 | Hester .................... B25F 5/008 173/217 |
| 2017/0157760 A1* | 6/2017 | McAuliffe ............. B25F 5/008 |

FOREIGN PATENT DOCUMENTS

| | | |
|---|---|---|
| EP | 0940864 A2 | 9/1999 |
| EP | 3 173 170 A1 * | 5/2017 |

* cited by examiner

ACTIVE COOLING FOR POWER TOOL GRIPPING SURFACES

TECHNICAL FIELD

The disclosure relates generally to power tools, and, in particular, to systems and methods for cooling gripping surfaces of power tools.

BACKGROUND

During operation, the motors and drive assemblies of power tools generate heat within the housing which can be transmitted to the user via the gripping surfaces of the tool. Heating is a concern particularly with power tools which utilize portions of the motor housing of the tool as a gripping region for the operator. For example, reciprocating saws typically utilize the front portion of the housing as a gripping region for an operator of the tool to use to stabilize the tool with one hand while the other hand holds the handle at the rear portion of the housing. The front gripping portion is located around and essentially directly over the motor and drive system of the reciprocating saw. As a result, the front gripping surface is exposed to a high level of heat during operation of the tool.

Power tools are often provided with features that are designed to minimize the amount of heat that an operator of the tool may be exposed to during operations. For example, the gripping surfaces of power tools, such as reciprocating saws, are often provided with an insulating covering or boot formed of rubber or urethane which can absorb heat to a certain degree and lessen their impact on the operator of the tool. To further facilitate cooling, some insulating boots are provided with ribs on the inner surface that define air flow channels between the insulating boot and the outer surface of the tool housing. The air flow through the channels cools the outer surface of the housing which in turn helps to keep the insulating boot cooler than it would be otherwise.

However, an insulating boot, with or without air flow channels, is only capable of cooling to the extent that an increase in temperature of the gripping surface is prevented or limited by dissipating heat from and/or minimizing heat transference to the gripping surface. A reduction in temperature of the gripping surface relative to ambient temperature is generally not possible using these methods. What is needed is a method or system for a power tool that enables active cooling of the gripping surfaces in a simple and inexpensive manner.

DRAWINGS

DETAILED DESCRIPTION

Figure 1:
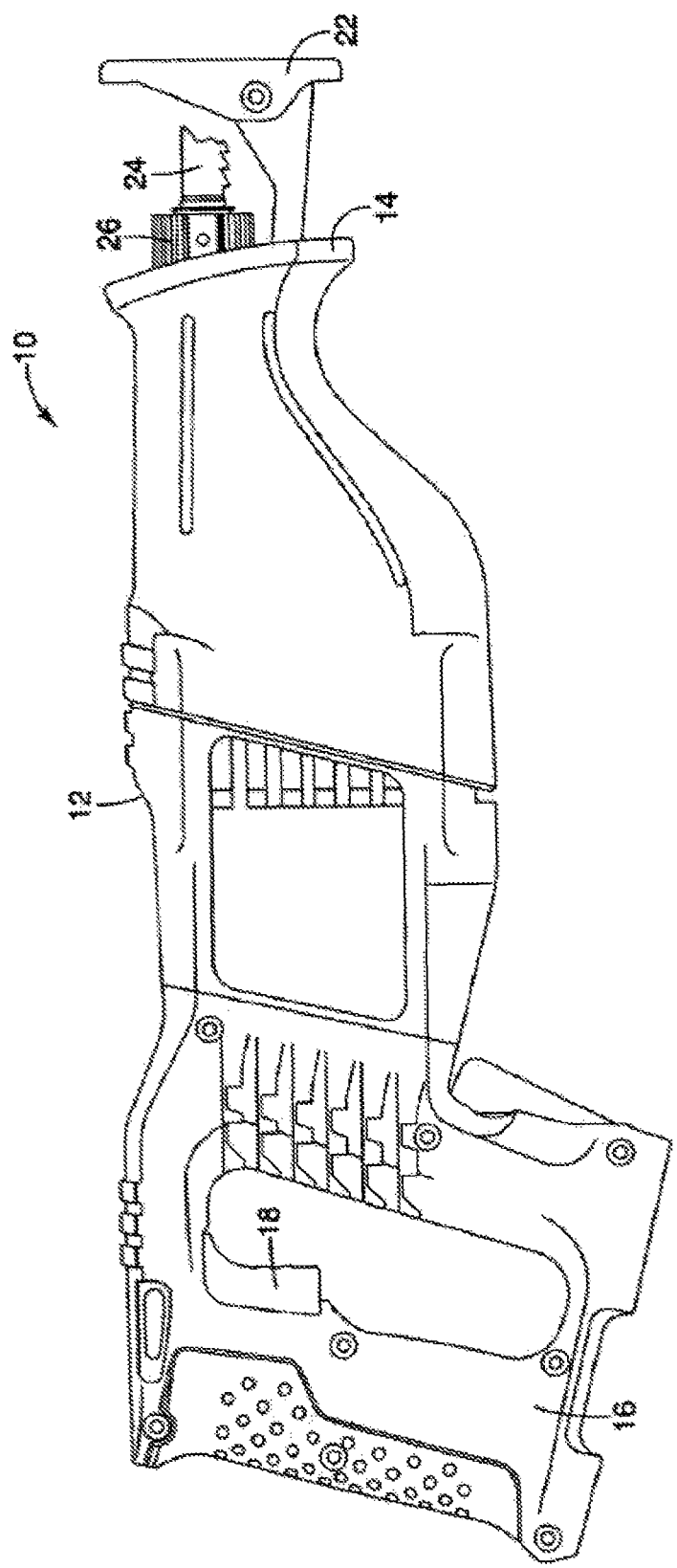
FIG. 1 is a side view of an embodiment of a power tool having a thermoelectric cooling system for active cooling of a gripping surface of the tool in accordance with the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

Figure 2:
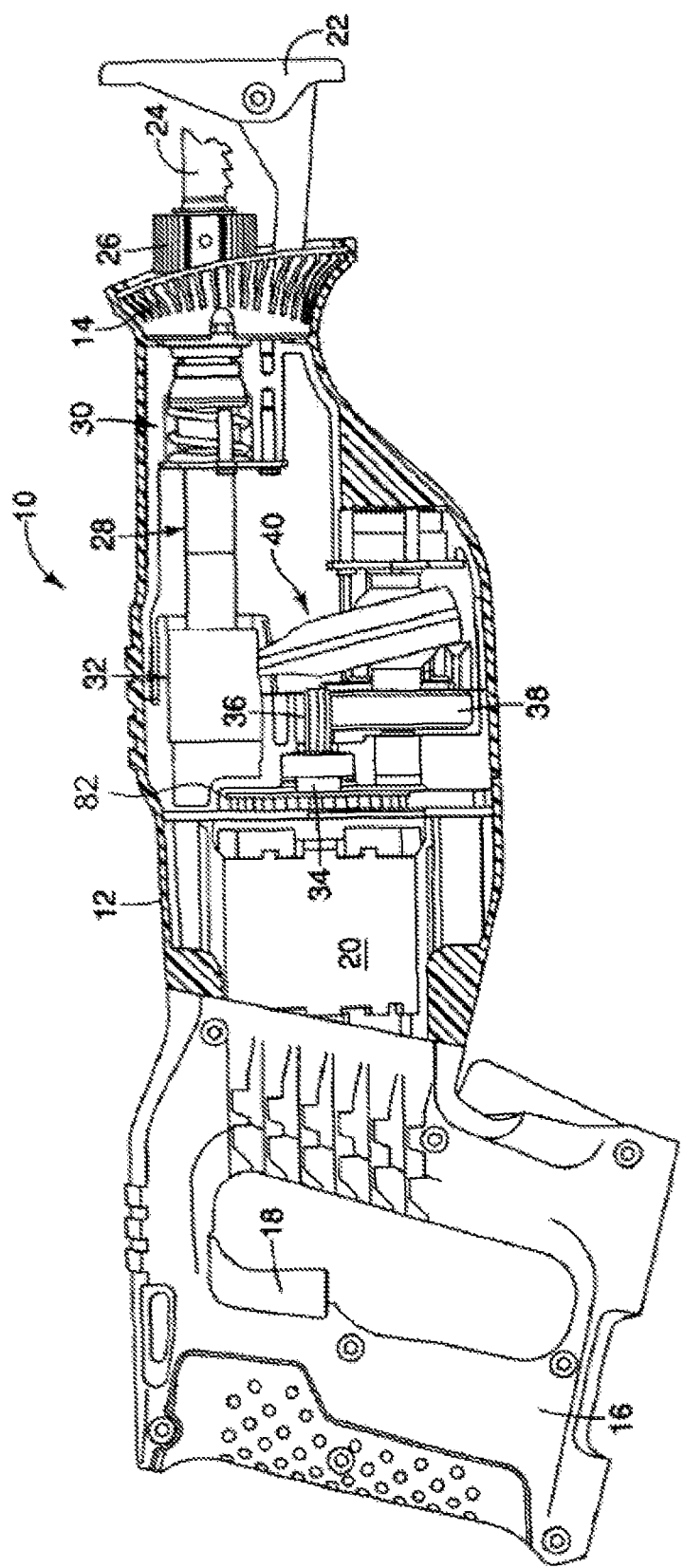
FIG. 2 is a side view of the preferred embodiment of the wobble plate assembly shown in FIG. 1 with portions removed to illustrate interior construction.

An embodiment of a power tool 10 including a cooling system in accordance with the present disclosure is depicted in FIGS. 1 and 2. The power tool 10 includes a gear housing 12 having a nose portion 14 and a handle portion 16. The housing 12 is typically formed of metal, such as die cast aluminum, although any suitable material(s) may be used. A motor 20 and a drive assembly 40 is enclosed in the housing 12. The motor 20 comprises an electric motor having an output shaft 34 that is configured to be rotated by the motor. The drive assembly 40 includes a tool holder 26 that is configured to retain a working tool 24 that extends from the nose portion 14 of the housing.

Power to the motor 20 is controlled by a trigger switch 18 provided on the handle portion 16 of the housing 12. In one embodiment, the power tool is configured to be powered by a rechargeable battery (not shown), such as a rechargeable lithium-ion battery, which can be connected to the handle portion of the housing. Alternatively, the power tool may be configured to receive power from an external power source, such as an AC outlet, via a power cord (not shown).

The drive assembly 40 is coupled to the output shaft 34 and is configured to convert the rotational motion of the output shaft 34 into an appropriate drive motion for driving a working tool 24. In one embodiment, the power tool 10 comprises a reciprocating saw. In this embodiment, the drive assembly comprises a plunger 28 that is slideable in front and rear bushing assemblies 30, 32, respectively. A pinion gear 36 is mounted on the output shaft 34 that engages a larger gear 38 that is connected to a reciprocating drive assembly in the form of a wobble plate assembly, for example. The wobble plate assembly drives the plunger 28 in a reciprocating manner as the gear 38 drives the wobble plate assembly. The tool holder 26 is provided on the end portion of the plunger 28 located externally with respect to the nose portion 14 of the housing. The tool holder 26 is configured to retain a cutting blade 24 in alignment with the reciprocating axis. A shoe 22 is attached to the nose portion of the housing. The shoe 22 provides a surface that can be positioned in contact with a work piece to guide movement and control the depth of the blade while making cuts.

During operation, the motor and drive assembly of the tool generate heat and vibrations within the housing which can be transmitted to the user via the gripping surfaces of the tool. The reciprocating power tool includes two primary gripping surfaces. One gripping surface is on the handle where the trigger switch is located. The other gripping surface is provided on the front portion of the housing. As can be seen in FIG. 1, the front portion of the housing is flared outwardly to provide an ergonomic shape for a user to grasp. The handle portion and the front portion of the housing may each be provided with a rubber covering as can be seen in FIG. 1.

To minimize the transference of heat and vibrations to an operator, at least the front gripping region is provided with an insulating covering or boot 42 formed of rubber or urethane which can absorb heat and vibrations to a certain degree and lessen their impact on the operator of the tool. To further facilitate cooling in the front gripping portion, a thermoelectric cooling system 50 is incorporated into the rubber boot to provide active cooling of the gripping surface. As used herein, "active cooling" refers to the ability of the cooling system to cool the gripping surface to below ambient temperatures.

Figure 3:
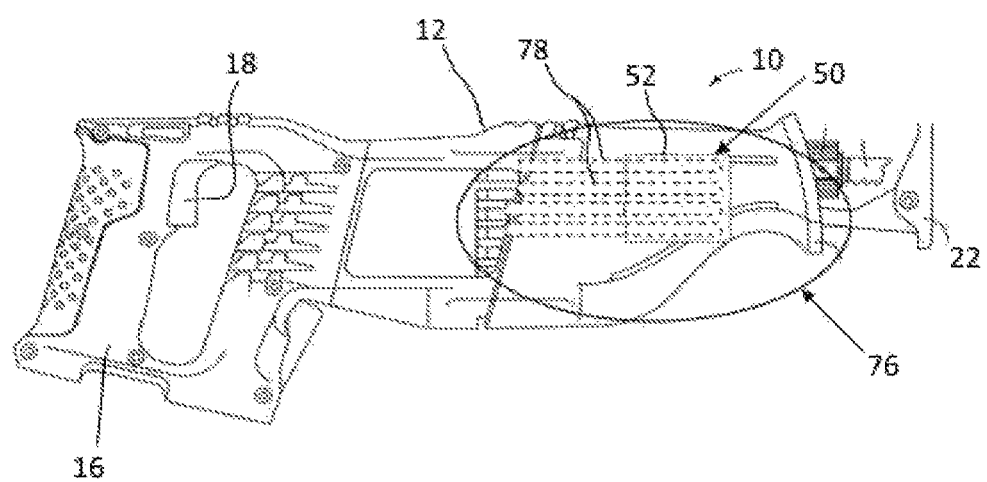
FIG. 3 is a schematic view of a thermoelectric cooling unit incorporated into the power tool of FIGS. 1 and 2.
Figure 4:
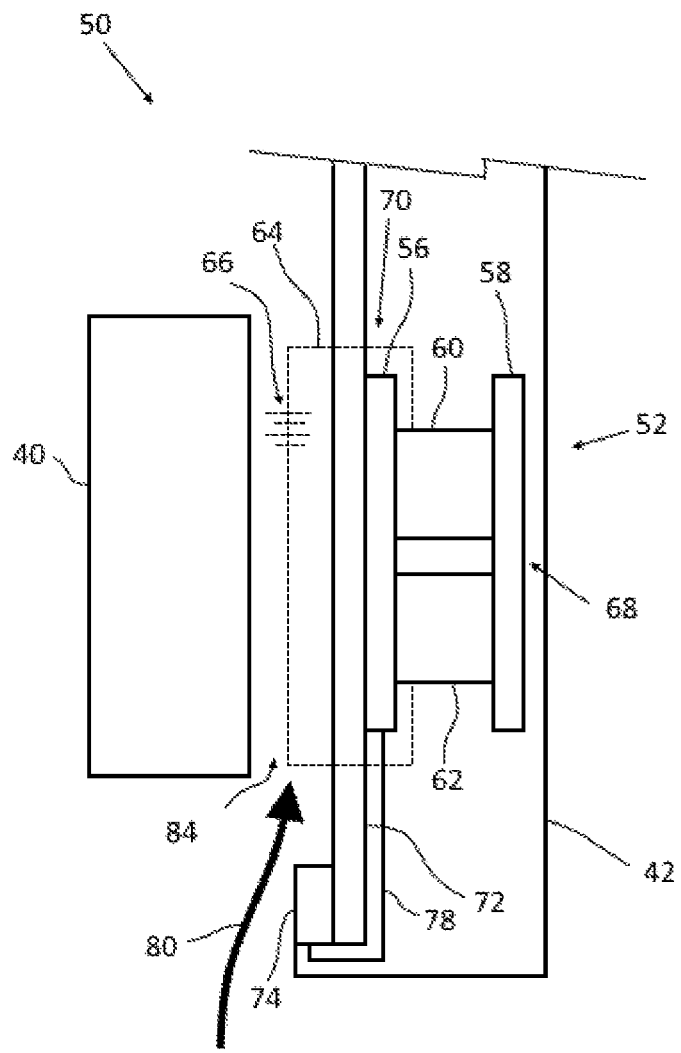
FIG. 4 is a schematic illustration of the thermoelectric cooling unit of FIG. 3

Referring to FIGS. 3 and 4, the thermoelectric cooling system 50 includes a thermoelectric cooling unit 52 and a heat sink 74. The thermoelectric cooling unit 52 comprises a pair of thermally conductive plates 56, 58, such as ceramic plates, having two dissimilar semi-conductors 60, 62 arranged therebetween. The two dissimilar conductors 60, 62 may be n-type and p-type conductive elements which are connected electrically in series and thermally in parallel. The thermoelectric cooling unit 52 is configured to receive a DC current via wiring conductors 64 which are coupled to a power source 66, such as the internal electronics of the tool. Alternatively, power to the cooling unit may be provided by a separate battery or batteries which may be incorporated into the device and supported within the rubber boot.

To activate cooling, a voltage is applied to the free ends of the two different conducting materials, resulting in a flow of current through the two semiconductors 60, 62 in series. The cooling unit 52 may be connected such that the voltage is applied to the cooling unit 52 whenever the motor is operating so that cooling is provided at all times. In alternative embodiments, the cooling system may include a switch (not shown) that enables the cooling system to be activated and deactivated as needed. In some embodiments, the cooling system may include a switch or a controller to control electronics to maintain the setting.

When activated, the flow of DC current across the junction of the two semi-conductors 60, 62 creates a temperature difference. As a result of the temperature difference, Peltier cooling causes heat to be absorbed into the device from one side, i.e., the "cold" side, and moved to the other side, i.e., the "hot" side. Referring to FIG. 4, the cold side 68 of the thermoelectric cooling unit 52 is positioned in thermal contact with the interior of the rubber boot 42 while the hot side 70 of the thermoelectric cooling unit 52 is positioned in thermal contact with the outer surface 72 of the housing 12. As a result, the thermoelectric cooling unit 52 causes a temperature difference that results in heat being absorbed from the rubber boot 42 on the cold side 68 and transferred to the hot side 70 of the thermoelectric cooling unit 52. In some embodiments, the cold side 68 of the thermoelectric cooling unit 52 is positioned in thermal contact with the interior of the rubber boot 42 while the hot side 70 of the thermoelectric cooling unit 52 is positioned in thermal contact with an inner surface of the housing 12.

To help dissipate heat absorbed into the thermoelectric cooling unit 52, the hot side 70 of the cooling unit is thermally coupled to the heat sink 74 which releases heat from the thermoelectric cooling unit 52 so that the hot side of the thermoelectric cooling unit 52 remains at ambient temperature, while the cool side goes below ambient temperature (i.e., active cooling). The thermoelectric cooling unit 52 is positioned preferably (although not necessarily) under the location where a user's hands are likely to be located. The heat sink 74 is preferably located outside of the gripping region 76 so that the released heat is not reabsorbed by the rubber boot 42 and/or so the released heat does not adversely impact the operation of the thermoelectric cooling unit 52.

As depicted in FIGS. 3 and 4, the heat sink 74 may be located remotely from the thermoelectric cooling unit 52, and thermal conductors 78, such as heat pipes, may be used to conduct heat from the thermoelectric cooling unit 52 to the heat sink 74. In one embodiment, the heat sink 74 is located inside the housing 12 in the internal air stream 80 generated by the motor fan 82 (FIG. 2). For example, the housing may include air flow channels 84 which are located inside the housing 12 which are configured to direct a cooling air flow 80 from the motor fan 82 over the drive components in the housing. The heat sink 74 can be mounted in a position where the heat transported from the thermoelectric cooling unit 52 can be released in the air flow generated by the motor fan. Any suitable type of heat pipe 78 may be used to conduct heat from the thermoelectric cooling unit 52 to the heat sink 74.

The cooling system 50 may be incorporated onto the power tool in any suitable manner. In one embodiment, the components of the thermoelectric cooling system 50 may be embedded into the interior portion of the insulating boot 42. Alternatively, the cooling system 50 components may be installed on the housing 12 of the tool prior to the placement of the insulating boot 42.

Although not depicted in the drawings, thermoelectric coolers may be used in other locations on the tool such as in the rear handle portion 16. In addition, although the thermoelectric cooling system has been described in conjunction with a reciprocating saw, thermoelectric coolers may be used for active cooling of the gripping surfaces of any tool.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A power tool comprising:
   a housing having a front portion and a handle portion, the front portion defining a cavity that encloses a motor and including a gripping portion surrounding the cavity, the handle portion including a switch configured to control power to the motor;
   a drive assembly coupled to the motor and including a tool holder located externally with respect to the housing, the drive assembly being configured to impart a drive motion to the tool holder in response to being driven by the motor, the tool holder being configured to retain a working tool for performing work when the tool holder is driven to move by the drive assembly;
   an insulating cover provided on the gripping portion of the housing, the insulating cover including a gripping surface; and
   a thermoelectric cooling unit located between the gripping portion of the housing and the insulating cover, the thermoelectric cooling unit comprising a pair of thermally conductive plates having two dissimilar semiconductors arranged therebetween and a first one of the pair of thermally conductive plates defining a cold side positioned in thermal contact with an inner surface of the insulating cover and a second one of the pair of thermally conductive plates defining a hot side positioned in thermal contact with the gripping portion of the housing,
   wherein the thermoelectric cooling unit is configured to absorb thermal energy from the insulating cover via the cold side of the thermoelectric cooling unit and to release the absorbed thermal energy via the hot side of the thermoelectric cooling unit.

2. The power tool of claim 1, wherein the thermoelectric cooling unit is configured to receive an electric current for powering the thermoelectric cooling unit from an electrical system of the power tool.

3. The power tool of claim 1, further comprising a heat sink coupled to the thermoelectric cooling unit for releasing heat from the hot side of the thermoelectric cooling unit.

4. The power tool of claim 3, wherein the heat sink is positioned in an air flow channel defined in the housing for directing a flow of air generated by a fan on the motor.

5. The power tool of claim 4, further comprising at least one heat pipe that transports heat from the hot side of the thermoelectric cooling unit to the heat sink.

6. The power tool of claim 1, wherein the insulating cover is formed of a rubber material.

7. The power tool of claim 6, wherein the thermoelectric cooling unit is embedded into the insulating cover.

8. The power tool of claim 1, wherein a first one of the dissimilar semi-conductors is an n-type conductive element and wherein a second one of the dissimilar semi-conductors is a p-type conductive element.

9. The power tool of claim 8, wherein the n-type conductive element and the p-type conductive element are connected electrically in series and thermally in parallel.

10. The power tool of claim 1, wherein each of the pair of thermally conductive plates is a ceramic plate.

11. A reciprocating saw comprising:
a housing having a front portion and a handle portion, the front portion defining a cavity that encloses a motor and including a gripping portion surrounding the cavity, the handle portion including a switch configured to control power to the motor;
a reciprocating drive assembly coupled to the motor and including a tool holder located externally with respect to the housing, the drive assembly being configured to impart a reciprocating drive motion to the tool holder in response to being driven by the motor, the tool holder being configured to retain a working tool for performing work when the tool holder is driven to move by the reciprocating drive assembly;
an insulating cover provided on the gripping portion of the housing, the insulating cover including a gripping surface; and
a thermoelectric cooling unit located between the gripping portion of the housing and the insulating cover, the thermoelectric cooling unit comprising a pair of thermally conductive plates having two dissimilar semi-conductors arranged therebetween and a first one of the pair of thermally conductive plates defining a cold side positioned in thermal contact with an inner surface of the insulating cover and a second one of the pair of thermally conductive plates defining a hot side positioned in contact with an outer surface of the gripping portion of the housing,
wherein the thermoelectric cooling unit is configured to absorb thermal energy from the insulating cover via the cold side of the thermoelectric cooling unit and to release the absorbed thermal energy via the hot side of the thermoelectric cooling unit.

12. The reciprocating saw of claim 11, wherein the thermoelectric cooling unit is configured to receive an electric current for powering the thermoelectric cooling unit from an electrical system of the reciprocating saw.

13. The reciprocating saw of claim 11, further comprising a heat sink coupled to the hot side of the thermoelectric cooling unit for releasing heat from the hot side of the thermoelectric cooling unit.

14. The reciprocating saw of claim 13, wherein the heat sink is positioned in an air flow channel defined in the housing for directing a flow of air generated by a fan on the motor.

15. The reciprocating saw of claim 14, further comprising at least one heat pipe that transports heat from the hot side of the thermoelectric cooling unit to the heat sink.

16. The reciprocating saw of claim 11, wherein the insulating cover is formed of a rubber material.

17. The reciprocating saw claim 16, wherein the thermoelectric cooling unit is embedded into the insulating cover.

\* \* \* \* \*